United States Patent [19]
Woo

[11] Patent Number: 5,548,777
[45] Date of Patent: Aug. 20, 1996

[54] INTERFACE CONTROL SYSTEM FOR A CD-ROM DRIVER BY MEMORY MAPPED I/O METHOD HAVING A PREDETERMINED BASE ADDRESS USING AN ISA BUS STANDARD

[75] Inventor: Tae-jin Woo, Incheon, Rep. of Korea

[73] Assignee: Samsung Electronics Co. Ltd., Kyungki-do, Rep. of Korea

[21] Appl. No.: 174,025

[22] Filed: Dec. 28, 1993

[30] Foreign Application Priority Data

Dec. 31, 1992 [KR] Rep. of Korea ............. 92-27543

[51] Int. Cl.[6] ................................. G06F 13/00
[52] U.S. Cl. ............ 395/821; 364/238.4; 364/242.91; 364/255.5; 364/DIG. 1; 364/927.99; 364/DIG. 2; 395/401; 395/412; 395/497.04; 395/823; 395/829; 395/872; 395/876
[58] Field of Search ................. 340/147; 364/200, 364/900; 395/250, 275, 425, 500, 800, 823, 401, 412, 497.04, 821, 823, 829, 872, 876

[56] References Cited

U.S. PATENT DOCUMENTS

| | | | |
|---|---|---|---|
| 3,715,725 | 2/1973 | Kievit et al. | 340/147 |
| 4,617,624 | 10/1986 | Goodman | 364/200 |
| 4,628,478 | 12/1986 | Henderson, Jr. | 364/900 |
| 4,815,034 | 3/1989 | Mackey | 364/900 |
| 4,868,738 | 9/1989 | Kish et al. | 364/200 |
| 4,924,432 | 5/1990 | Asai et al. | 395/166 |
| 4,930,065 | 3/1990 | McLagan et al. | 364/200 |
| 5,051,890 | 9/1991 | Nagasaki et al. | 364/200 |
| 5,058,004 | 10/1991 | Ravid | 364/200 |
| 5,089,953 | 2/1992 | Ludicky | 395/425 |
| 5,150,465 | 9/1992 | Bush et al. | 395/275 |
| 5,218,689 | 6/1993 | Hotle | 395/425 |
| 5,291,584 | 3/1994 | Challa et al. | 395/500 |
| 5,379,379 | 1/1995 | Becker et al. | 395/250 |
| 5,418,976 | 5/1995 | Iida | 395/800 |
| 5,444,852 | 8/1995 | Nakabayashi | 395/823 |

OTHER PUBLICATIONS

M Chandwani et al., "A Multiple-PC Based Architecture For Global Database Access", IEEE/IEE Publications Ondisc, pp. 451–455.

*Primary Examiner*—Thomas C. Lee
*Assistant Examiner*—Po Huang
*Attorney, Agent, or Firm*—Sughrue, Mion, Zinn, Macpeak & Seas

[57] ABSTRACT

An interface control system located between a PC and a CD-ROM includes an address selector, a first control signal generator, a second control signal generator, a bus transceiver, a control information transmitter, a read/write signal generator and a command/reset signal generator and interfaces between a host computer and a CD-ROM driver by a memory mapped I/O method using an ISA BUS standard.

10 Claims, 3 Drawing Sheets

INTERFACE CONTROL SYSTEM FOR A CD-ROM DRIVER BY MEMORY MAPPED I/O METHOD HAVING A PREDETERMINED BASE ADDRESS USING AN ISA BUS STANDARD

BACKGROUND OF THE INVENTION

The present invention relates to an interface control system located between a personal computer and a CD-ROM driver, and more particularly, to an interface control system of a memory mapped input/output (I/O) method using an Industry Standard Architecture (ISA) bus.

Recently, since the field of multi-media personal computers (hereinafter referred to as "MPCs") has newly developed a compact disk read only memory (CD-ROM) unit has been widely used as a media to store a large quantity of information. CD-ROM units can be divided into high-priced and low-priced models. A high-priced CD-ROM model adopts the Small Computer System Interface (SCSI) system which is an industrial standard for interfacing with a personal computer (PC) for input and output, and a low-priced CD-ROM model adopts a unique interfacing method using a PC-BUS (which is also called an ISA BUS). The bus is a channel connecting various devices and is specified as a series bus or parallel bus according to the composition and number of signal lines. Also, a bus can be a standard bus (used commonly) or an exclusive bus (used only for a specific system).

The SCSI system is for high-priced CD-ROMs and is a standard bus which originated from the Shugart Associates Standard Interface (SASI) manufactured in 1979 by Shugart which is a manufacturer of floppy disk drivers (FDD) and hard disk drivers (HDD). Then, SASI was renamed as SCSI and revision 15 thereof was recommended by the American National Standard Institute (ANSI) in 1982. SCSI revision 17B was completed in 1985 and notified publicly as the ANSI standard in 1986. SCSI signal lines are composed of nine control signals, eight data lines, data parity bit lines and power source ground lines. As is well known, the SCSI bus is characterized in that it has a distributed bus arbitrating function to which priority order is allotted and that it can accommodate a large quantity of high-speed peripheral equipment. However, the manufacturing process of such an interface control system for CD-ROM drivers using a SCSI bus is an expensive task.

Meanwhile, ISA is an interfacing method using an extension slot used for IBM compatible personal computers. The ISA is characterized in that all personal computers exceeding an XT level are basically equipped with a 62-pin edge connector and all personal computers exceeding an AT level are equipped with eight direct memory access (DMA) channels, sixteen interrupt channels, a 16-bit data bus, an address bus extended to 24 bits and an additional 36-pin edge connector. The ISA interface is constructed so that an ISA pin signal and a signal of the subject system to be interfaced are interfaced using logic elements without passing through another common interface system. There are three methods for reading or writing data through the utilization of such an ISA bus: direct memory access, memory mapped I/O and I/O mapped I/O.

In the DMA method, the central processing unit (CPU) of a computer does not perform input and output operations directly, but DMA chips which are dedicated chips for input and output purposes, request the central processing unit (CPU) to offer the bus to access a memory directly without passing through the CPU, when input and output operations are necessary. The memory mapped I/O method uses the same address space in allotting addresses of input and output devices as shown in FIG. 1A, and does not provide separately a memory space and I/O space. Hence, the control signal for reading or writing from/to a memory space is also used as the control signal for reading or writing from/to the input/output space. The I/O mapped I/O method divides the memory space and input/output device space into the respective address spaces as shown in FIG. 1B and requires respective control signals for reading and writing from/to the memory space and input/output space. Since an MPC limits the bandwidth of the CD-ROM driver to 40% that of a CPU, in order to keep a real time transfer rate of 150K bytes per second by eight bits within such a limited bandwidth, the memory mapped I/O method should be used.

SUMMARY OF THE INVENTION

Therefore, an object of the present invention is to provide an interface system using a memory mapped I/O technique using an ISA bus in order to attain an interface between a PC and a CD-ROM driver efficiently at a low price.

To accomplish the above object, there is provided a device according to the present invention which interfaces between a PC and a CD-ROM driver by a memory mapped I/O method using an ISA BUS, having: an address selector activated by a buffer address latch enabling signal for generating a select signal when address signals correspond with a predetermined base address;

a first control signal generator activated by the select signal for generating a first control signal according to an address signal;

a second control signal generator activated by the select signal for generating a second control signal according to the address signal and a memory read signal;

a bus transceiver activated by the first control signal for transmitting data, commands and status signals in either of two directions after deciding a transfer direction according to the memory read signal;

a control information transmitter for transmitting control information in the direction of the personal computer according to the second control signal;

a read/write signal generator activated by the first control signal for generating drive read and write signals by receiving memory read and write signals; and a command/reset signal generator for generating a command signal and a reset signal by receiving an address signal and a reset driver signal.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE PREFERRED EMBODIMENTS

The present invention will be described in detail with reference to the accompanying drawings.

Figure 1A:
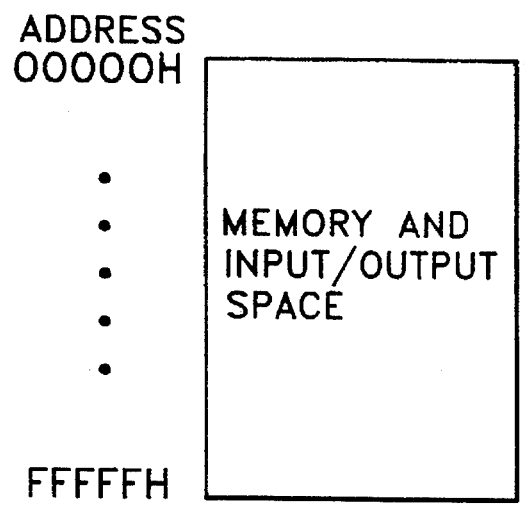
FIGS. 1A and 1B are schematic diagrams showing examples of allotments of addresses to explain general memory mapped I/O and I/O mapped I/O methods.
Figure 1B:
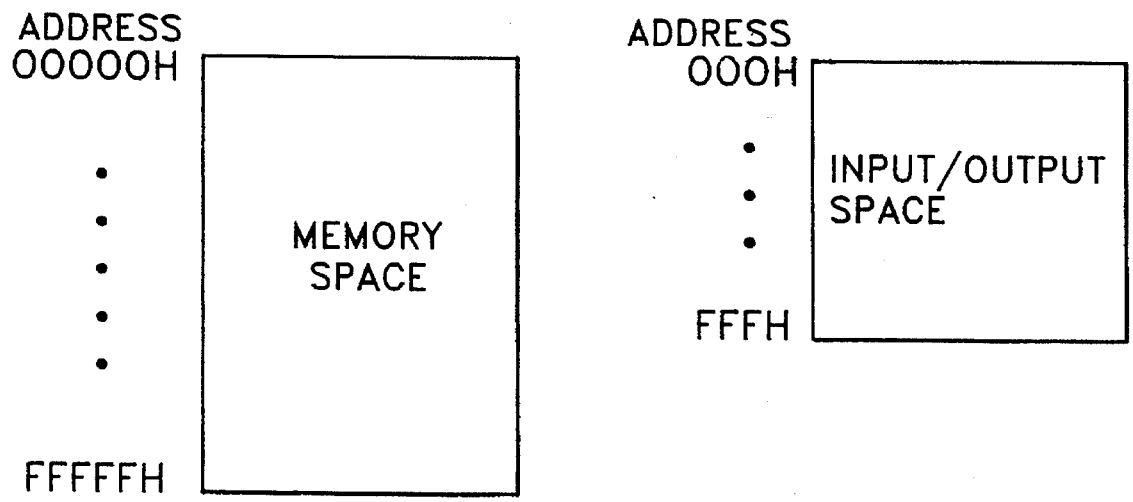
Figure 2:
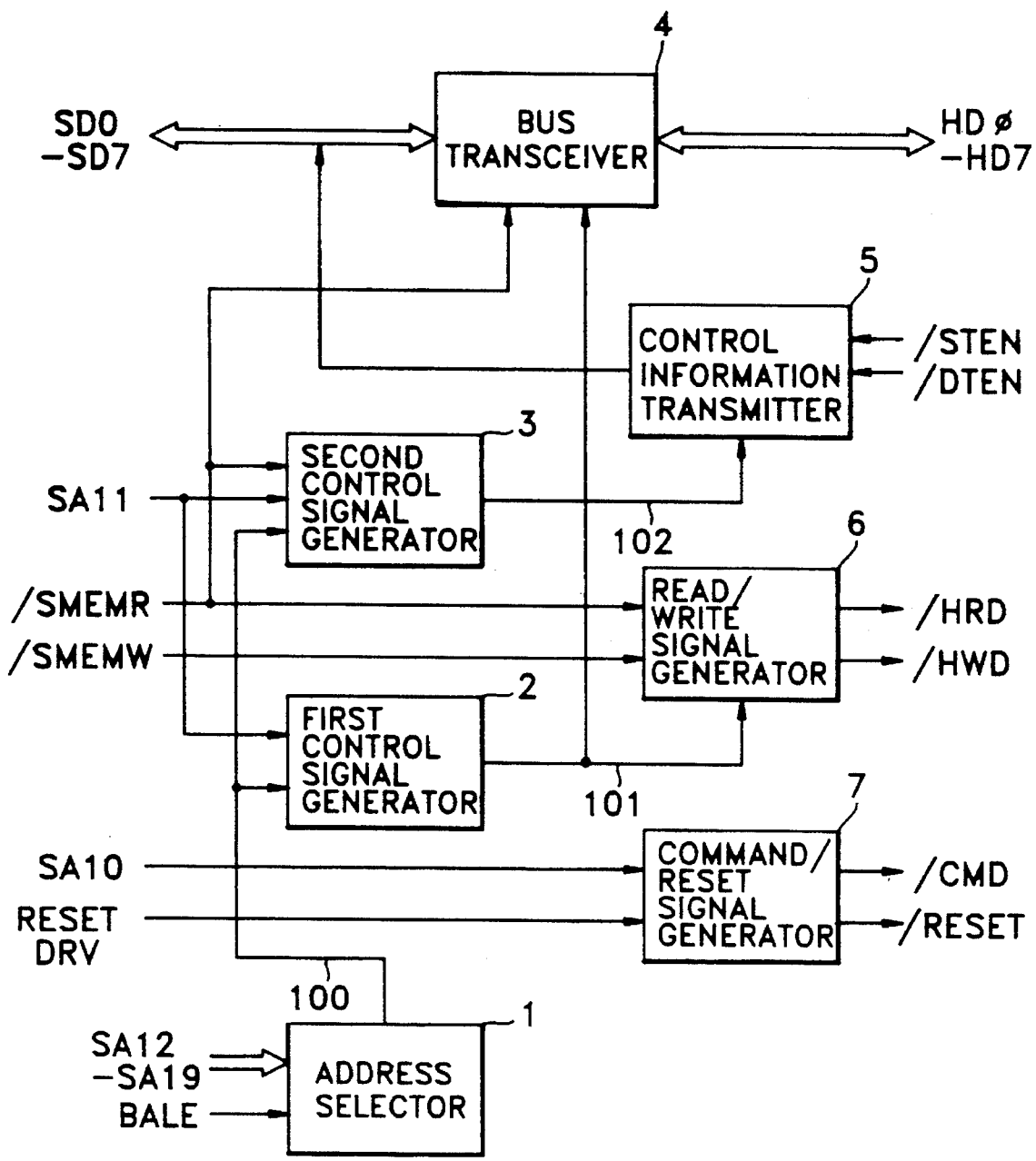
FIG. 2 is a block diagram showing a CD-ROM interface control system according to the present invention.

In FIG. 2, which is a block diagram of a CD-ROM interface control system according to the present invention, an interface control system has an address selector 1, a first control signal generator 2, a second control signal generator 3, a bus transceiver 4, a control information transmitter 5, a read/write signal generator 6 and a command/reset signal generator 7.

The way of allotting addresses to a device according to the present invention by a memory mapped I/O method will first be described. In a memory mapped I/O method, the hardware configuration becomes different depending on the way address spaces are allotted. In order to reduce the manufacturing cost by simplifying the hardware configuration, the device according to the present invention is constructed so that the address space for input/output is allotted by units of 4K bytes at any position within an address space of 1M byte. In other words, the address space of 4K bytes is determined by the base address of address buses SA12 to SA19 and the value of the base address can be given in address selector 1 at the user's option. Once input/output space of 4K is allotted in such a way, the allotted space is subdivided according to the interface operation by utilizing address buses SA10 and SA11 as shown in the following Table 1.

TABLE 1

| SA11 | SA10 | Alloted address space |
|------|------|------------------------|
| 1    | X    | Control information read space of 2K bytes |
| 0    | 1    | Command write and status read space of 1K byte |
| 0    | 0    | Data read space of 1K byte |

In Table 1, 4K space is allotted to an address space for interfacing between a PC and a CD-ROM driver by a base address determined in address selector 1. The PC gives a command to the CD-ROM driver through data bus signal SD0 to SD7 and receives data and a status. At this time, the PC directly checks whether the data or the status are receivable or not, by reading the signals /STEN and /DTEN. Hence, address SA11 is allotted in order to divide the address space of 4K allotted as described above into an access operation of control information /DTEN and /STEN and an access operation of data, command and status through the data bus. That is to say, a 4K byte space is divided into two 2K byte spaces according to the address state (low or high). Address SA10 is allotted to command signal /CMD, and thereafter, 2K byte spaces accessing the data bus are subdivided into two 1K byte spaces. In this way, the 2K space having a logic high address signal SA11 is allotted for a control information read operation, the other 2K space having a logic low address signal SA11 allots a 1K space whose address signal SA10 is high to a status read and command write and a 1K space whose address signal SA10 is low is allotted to a data read operation.

Meanwhile, there are three kinds of information to be interfaced between the PC and the CD-ROM according to the present invention. These are command, data and status information. A command is given from a PC to a CD-ROM driver and the data and status are from the CD-ROM driver to the PC. That is, generally speaking, the signals to be used for an interface control system are roughly either a signal to be interfaced with a PC or one to be interfaced with a CD-ROM driver. In general, part of an ISA standard bus signal is used for the interface with a PC. The below Table 2 shows the names of ISA bus signals, which are used between the device according to the present invention and a PC, the function of the signals and whether the signals are input or output.

TABLE 2

| Signal Name | Function | Input/Output |
|-------------|----------|--------------|
| SD0-SD7 | Data bus signals | I/O |
| /SMEMR | A control signal for reading data or status from CD-ROM driver or reading control information | I |
| /SMEMW | A control signal for writing a command in the CD-ROM driver | I |
| BALE | A control signal for preventing the allotted input/output space from being read or written by a wrong DMA operation | I |
| SA10-SA19 | Address bus signal | I |
| RESET DRV | A signal for PC to reset CD-ROM driver | I |

In Table 2, a slash in front of a signal's nomenclature represents that the signal is activated low, the letter "I" in the input/output column represents input, the letter "O" represents output and the expression "I/O" is for input/output.

Data bus signals SD0–SD7 are channels for information such as data, command and status information to be transmitted.

Memory read signal /SMEMR is a signal input from a PC for reading data, status and control information /DTEN and /STEN of a CD-ROM driver and memory write signal /SMEMW is a signal input from a PC for writing a command in a CD-ROM driver. The memory read and write signals /SMEME and /SMEMW are usually used for accessing the address space below 1M. Buffer address latch enabling signal BALE is a signal for preventing a wrong DMA operation from reading and writing input/output space to be used for the embodiment of the present invention. Address bus signals SA10 to SA19 which are channels of addresses are used for accessing the allotted address space. Driver reset signal RESET DRV is a signal input for resetting the CD-ROM driver when the PC is reset in a hardware process.

Meanwhile, the below Table 3 shows the names of the signals which are used for interfacing between the device and the CD-ROM driver according to the present invention, the functions of the signals and whether the signals are input or output.

TABLE 3

| Signal | Function | Input/Output |
|--------|----------|--------------|
| HD0-HD7 | Data bus signals | I/O |
| /HRD | A control signal of a PC for reading data or a status from a CD-ROM driver | O |
| /HWR | A control signal of a PC for writing command in a CD-ROM driver | O |
| /CMD | A signal for differentiating data as 'low' and 'high' signals, respectively, according to whether the data on the data bus is command and status or data | O |
| /DTEN | A control information of a CD-ROM for informing a PC that data is permitted to be read | I |
| /STEN | A control information of a CD-ROM for informing a PC that status is permitted to | I |

TABLE 3-continued

| Signal | Function | Input/Output |
|---|---|---|
| | be read | |
| /RESET | A signal for resetting a CD-ROM | O |

In Table 3, data bus signals HD0 to HD7 are channels for the information such as data, command and status to be transmitted to the CD-ROM. Driver read signal /HRD is an output signal for reading data or status from a CD-ROM driver according to memory read signal /SMEMR which is input from a PC. Driver write signal /HWR is an output signal for a writing command in a CD-ROM driver according to memory write signal SMEMW which is input from a PC. Command signal /CMD which is an output signal to a CD-ROM driver according to address signal S10, becomes a logic low level in the case of the read or write data being command or status and a logic high in the case of the data being actual data. Also, a command signal tells a CD-ROM driver whether what a PC is to read from the CD-ROM driver is data or status. However, it is not defined to write the logic high signal in a CD-ROM driver. In Table 3, data enabling signal /DTEN is an input signal informing a PC that data is permitted to be read. Here, a logic low data enabling signal means that data is permitted to be read. Status enabling signal /STEN is an input signal informing a PC that a CD-ROM driver is permitted to read status information. Here, a logic low status enabling signal means that status information is permitted to be read. Reset signal RESET is an output signal for resetting a CD-ROM driver according to driver reset signal RESET DRV when a PC is reset via hardware means (hard boot).

In FIG. 2, address selector 1 announces that the device according to the present invention has been selected by making the select signal 100 low when an address input to address bus signals SA12 to SA19 correspond with a predetermined base address and buffer address latch enabling signal BALE is low. First control signal generator 2 generates a first control signal 101 for controlling read/write signal generator 6 by receiving address signal SA11 and select signal 100. Second control signal generator 3 generates a second control signal 102 for controlling bus transceiver 4 and control information transmitter 5 by receiving address signal SA11, select signal 100 and memory read signal /SMEMR. Control information transmitter 5 transmits control information /STEN, /DTEN and the information from a grounded port from a CD-ROM driver to the PC through data buses SD0 to SD3 according to second control signal 102. Read/write signal generator 6 generates driver read and write signals /HRD and /HWR by receiving memory read and write signals /SMEMR and /SMEMW according to first control signal 101. Command/reset signal generator 7 generates command signal /CMD and reset signal /RESET by receiving from a PC an address signal S10 and reset driver signal RESET DRV. Bus transceiver 4 which is located between PC data bus signals SD0 to SD7 and CD-ROM data bus signals HD0 to HD7, determines the transfer direction of data according to memory read signal /SMEMR and transmits data, command and status information in either direction after being activated according to first control signal 101.

Figure 3:
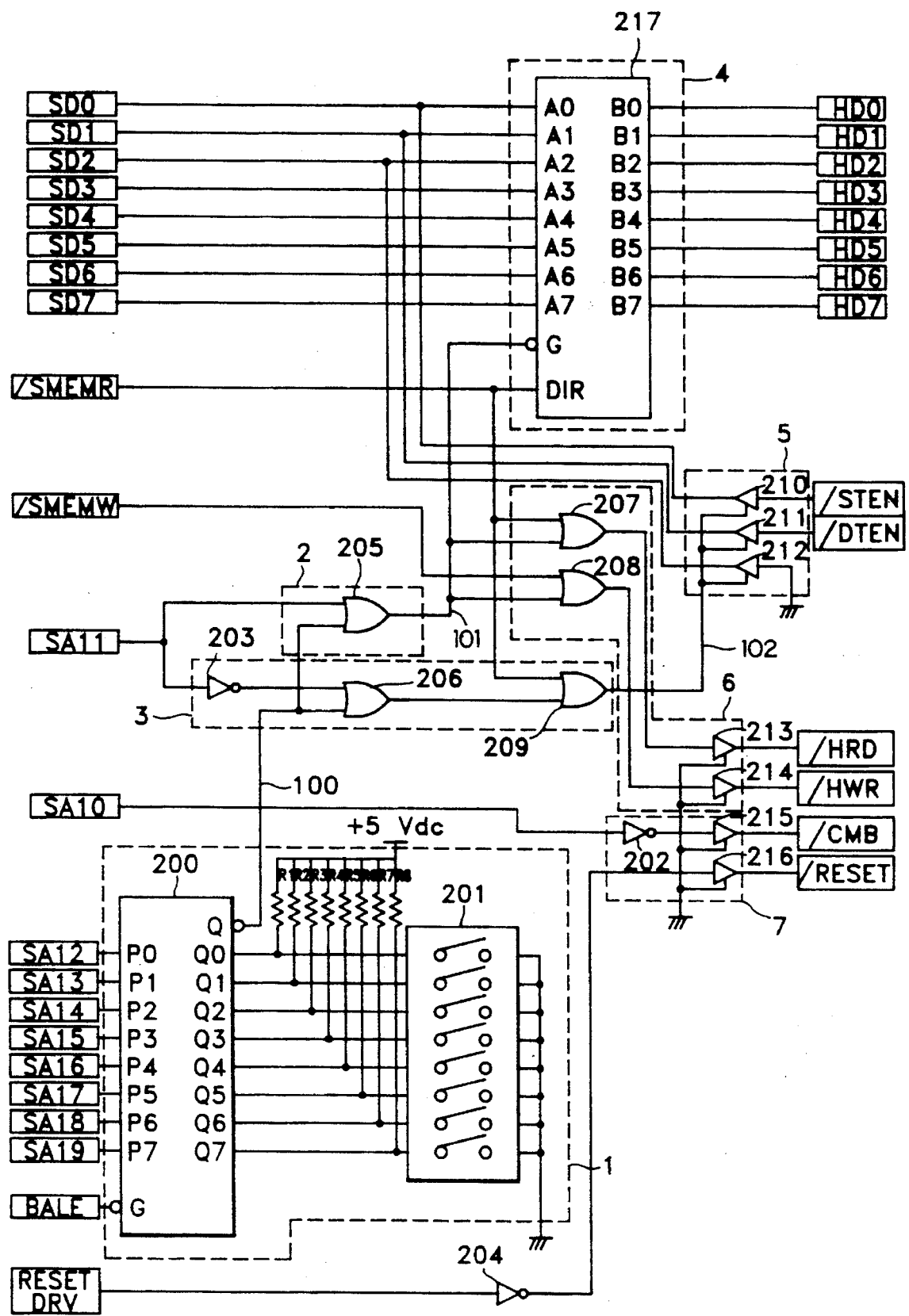
FIG. 3 is a specific circuit diagram showing an embodiment of the device shown in FIG. 2.

In FIG. 3 which is a specific circuit diagram showing an embodiment of the device shown in FIG. 2, address selector 1 has an 8-bit comparator 200 and a switch 201, a first control signal generator 2 has an OR gate 205 and a second control signal generator 3 includes an inverter 203 and OR gates 206 and 209.

Bus transceiver 4 includes a single 8-bit bus transceiver chip 217 and control information transmitter 5 includes tri-state buffers 210, 211 and 212. Read/write signal generator 6 has OR gates 207 and 208 and tri-state buffers 213 and 214. Command/reset signal generator 7 includes an inverter 202 and tri-state buffers 215 and 216. In FIG. 3, 8-bit comparator 200 is enabled when buffer address latch enabling signal BALE is low and outputs a "low" selector signal 100 when the address which is input to address bus signals SA12 to SA19 corresponds with the predetermined base address to switch 201 when compared. By utilizing switch 201 in such a way, the base address is determined randomly as the space of 4K bytes within the scope of 1M bytes. The select signal 100 is input to OR gates 205 and 206. As another input of OR gate 205, address signal SA11 is input and outputs a control signal 101 enabling 8-bit bus transceiver 217 which is connected with data bus signals HD0 to HD7. OR gate 206 receives as an input a signal which is a logically inverted address signal inverted by inverter 203 and outputs a control signal 102 enabling tri state buffers 210 to 212 to read control information. OR gate 207 outputs a driver read signal /HRD by performing a logical sum operation on control signal 101 and memory read signal /SMEMR. OR gate 208 outputs a driver write signal /HWR by performing a logical sum operation on control signal 101 and memory write signal /SMEMW. Memory read signal /SMEMR which is devised to be connected to the direction determining terminal DIR of 8-bit bus transceiver 217 establishes the direction of the data bus interface as being from a CD-ROM driver to a PC when the host computer (PC) reads the CD-ROM and from the PC to the CD-ROM driver in other cases. The output of OR gate 206 and memory read signal /SMEMR are logically summed by OR gate 209 to read control information /STEN and /DTEN from tri state buffers 210 and 211 and is connected to enabling terminals of tri state buffers 210, 211 and 212. If inverter 203 is placed between OR gate 205 and address signal SA11, the divided space is changed from memory map to 2K bytes. Also, if inverter 202 is left out, the spaces of 1K byte are interchanged. When control information is read, only status enabling signal /STEN and data enabling signal /DTEN are connected to data bus signals SD0 and SD1 and the other six bits SD2 to SD7 become useless. At this time, if more than one of the unused bits SD2 to SD7 are grounded, the PC device driver can find the memory space which is used in the present invention. Also, if the CD-ROM driver receives an active low reset signal, the reset driver signal RESET DRV of the PC is logically inverted in inverter 204 and is connected to reset signal /RESET of the CD-ROM driver. Resistors R1 to R8 are pull-up resistors connected to a +5 V reference voltage, and tri state buffers 213 to 216 whose enabling terminals are always grounded function as a buffer which simply transfers the input signal.

Table 4 below shows the relationship between input signals and output signals in a circuit example such as FIG. 3.

TABLE 4

| | | Input Signal | | | Output signal | | | | | Function |
|---|---|---|---|---|---|---|---|---|---|---|
| | SA11 | SA10 | /SMEMR | /SMEMW | /HRD | /HWR | /CMD | 102 | 101 | |
| Logic value | 0 | 0 | 0 | 1 | L | H | H | H | L | Data read |
| | 0 | 0 | 1 | 0 | H | L | H | H | L | Undefined (1) |
| | 0 | 1 | 0 | 1 | L | H | L | H | L | Status read |
| | 0 | 1 | 1 | 0 | H | L | L | H | L | Command write |
| | 1 | 0 | 0 | 1 | H | H | H | L | H | Control information read |
| | 1 | 0 | 1 | 0 | H | H | H | H | H | Undefined (2) |
| | 1 | 1 | 0 | 1 | H | H | L | L | H | Control information read |
| | 1 | 1 | 1 | 0 | H | H | L | H | H | Undefined (3) |

If addresses are allotted as described above, the practical addresses are determined by adding base address signals SA12 to SA19 to address signals SA10 and SA11. In other words, since there is no case that memory read signal /SMEMR and memory write signal /SMEMW are the same, i.e., the case that the signals are "high" and "low" at the same time, Table 4 shows all cases except for this case. As indicated in the function column of Table 4, the function of the various signals are divided into data read, status read, command write, control information read and undefined operations. The operation of undefined (1) for the case of data write is not defined since there is no case that data is written in a CD-ROM. The operations of undefined (2) and (3) for the case of control information write are undefined because control information /DTEN and /STEN also proceeds only from the CD-ROM to the PC. The necessary function of such undefined spaces (1), (2) and (3) can be operated by further definition of the hardware as necessary. Also, when control information is to be read, memory read signal /SMEMR reads control information after disabling a control signal 101 (logic high) which enables bus transceiver 4. Control signal 102 is enabled only at the time of reading control information but is disabled at the time of data read, command write and status read operations, which use data bus signals HD0 to HD7.

As described above, the present invention reduces the manufacturing cost by realizing an interface control system at a low cost, which is applicable in interfacing a personal computer and its peripheral equipment such as a CD-ROM, etc. Also, the address space to be interfaced with peripheral equipment can be selected randomly in a rather wide scope by a memory mapped I/O method.

What is claimed is:

1. A CD-ROM interface control system which interfaces between a PC and a CD-ROM driver by a memory mapped I/O method using an ISA BUS standard, comprising:

an address selector activated by a buffer address latch enabling signal for generating a select signal when address signals correspond with a predetermined base address;

a first control signal generator activated by said select signal for generating a first control signal according to an address signal;

a second control signal generator activated by said select signal for generating a second control signal according to said address signal and a memory read signal;

a bus transceiver activated by said first control signal for transmitting data, commands and status signals in either of two directions after deciding a transmission direction according to said memory read signal;

a control information transmitter for transmitting control information in the direction of said PC according to said second control signal;

a read/write signal generator activated by said first control signal for generating drive read and write signals by receiving memory read and write signals; and a command/reset signal generator for generating a command signal and a reset signal by receiving an address signal and a reset driver signal.

2. The system of claim 1, wherein a 4K input/output address space is determined at any position within a 1M space using an upper bit of an address bus, said determined input/output space of 4K bytes is divided into two 2K bytes and then allotted to control information access and data bus access, respectively, and a 2K byte space allotted to said data bus access is subdivided into two 1K byte spaces according to an interfacing content.

3. The system of claim 1, wherein said address selector includes a switch for setting a base address selected at random and a comparator for comparing the base address set in said switch and input address signals.

4. The system of claim 1, wherein said first control signal generator has an OR gate for determining the logical sum of said select signal and address signal.

5. The system of claim 1, wherein said second control signal generator includes a first OR gate for generating the logical sum of said select signal and an inverted signal of said address signal and a second OR gate for obtaining the logical sum of the output of said first OR gate and said memory read signal.

6. The system of claim 1, wherein said control information includes a status enabling signal which permits a PC to read the status signal generated by a CD-ROM driver and a data enabling signal which permits a PC to read the data generated by a CD-ROM driver.

7. The system of claim 1, wherein said control information transmitter includes a first buffer for transmitting said status enabling signal from the CD-ROM driver to the PC and a second buffer for transmitting said data enabling signal from the CD-ROM driver to the PC, according to said second control signal.

8. The system of claim 1, wherein said control information transmitter further includes a buffer for transmitting information from a grounded port according to said second control signal in order to recognize a control system space when a PC scans its memory.

9. The system of claim 1, wherein said read/write signal generator includes a driver read signal generator for generating a driver read signal according to said memory read signal by being activated by said select signal and a driver write signal generator for generating a driver write signal according to said memory write signal by being activated by said select signal.

10. The system of claim 1, wherein said command/reset signal generator includes a command signal generator to which said address signal is input for generating a command signal which identifies a current operation which is being performed by a PC as data read, command write or status read and a reset signal generator for resetting the CD-ROM according to said reset driver signal.

* * * * *